United States Patent [19]

Phillips

[11] Patent Number: 5,000,215

[45] Date of Patent: Mar. 19, 1991

[54] BELLOWS SEAL FOR VALVES AND THE LIKE

[76] Inventor: Edwin D. Phillips, 700 Cedar Ave., Middlesex, N.J. 08846

[21] Appl. No.: 553,584

[22] Filed: Jul. 18, 1990

Related U.S. Application Data

[63] Continuation of Ser. No. 370,829, Jun. 23, 1989, abandoned, which is a continuation of Ser. No. 186,926, Apr. 27, 1988, abandoned.

[51] Int. Cl.$^5$ .............................................. F16K 31/00
[52] U.S. Cl. .................................... 137/15; 251/335.3
[58] Field of Search ................... 251/335.3, 63.5, 265; 137/907, 1, 15

[56] References Cited

U.S. PATENT DOCUMENTS

| | | | |
|---|---|---|---|
| 1,527,154 | 2/1925 | Mallory et al. | 251/265 |
| 2,153,223 | 4/1939 | Thomas et al. | 251/335.3 |
| 2,431,297 | 11/1947 | Moore | 137/907 |
| 3,326,512 | 6/1967 | Clarke | 251/86 |
| 3,550,903 | 12/1970 | Hauser | 251/333 |
| 4,688,601 | 8/1987 | Astill | 251/335.3 |

FOREIGN PATENT DOCUMENTS 2257096  7/1973  Fed. Rep. of Germany ..... 251/63.5

Primary Examiner—A. Michael Chambers
Attorney, Agent, or Firm—Shoemaker and Mattare

[57] ABSTRACT

A unique bellows seal for sealing valve components, joining sections of pipe together, and the like, includes an elongate, accordion-pleated body having first and second ends and a plurality of axially spaced apart reinforcing rings thereon. The seal is machined from a solid piece of material to produce an elongate, thin-walled tubular section having the reinforcing rings on the outer surface thereof and is then axially compressed to form the accordion-like pleats. In one form of the invention, the seal extends coaxially around the actuator shaft of a valve to seal the actuator shaft relative to the valve body. Threaded portions on the opposite ends of the seal and on spaced portions of the actuator shaft are interengaged to cause reciprocating movement of a valving member when the shaft is rotated. The pitch of the threaded portions may be reversed from one another to effect doubling of the rate of movement of the valving member upon given rotation of the shaft. In a variation of the invention, a pressure responsive piston may be provided on the actuator shaft rather than the threaded portions for causing movement of the shaft and valving member carried thereby.

7 Claims, 4 Drawing Sheets

BELLOWS SEAL FOR VALVES AND THE LIKE

This is a continuation, of application Ser. No. 07/370,829, filed June 23, 1989 which is a continuation of application Ser. No. 07/186,926 filed Apr. 27, 1988, now abandoned.

FIELD OF THE INVENTION

This invention relates to seals, and more particularly, to a bellows seal for use in valves, pipe connections and the like.

PRIOR ART

Seals for sealing against fluid loss in valves and pipelines, for example, currently include various designs embodying one or a combination of o-rings, gaskets, diaphragms, bellows and the like. The use of o-rings and gaskets is probably most common, but in some installations involving corrosive materials such seals may not be suitable because of their exposure to the corrosive environment and the resultant need to make the seals of an expensive material capable of resisting the corrosive environment. Moreover, in order for an o-ring to provide an effective seal in situations requiring reliable sealing against fluid loss, the tolerances of mating or adjacent components must be kept within carefully controlled limits.

Bellows type seals are sometimes used in situations where an o-ring seal would not be satisfactory. Such bellows seals are generally relatively expensive, however, requiring particular manufacturing processes such as molding, etc. to form the bellows. In some applications, a bellows is manufactured by molding, etc. and steel reinforcing rings are then placed around the bellows to give it radial strength to resist internal pressures.

Further, in the manufacture of various glass shut off and metering valves used in the chemical industry, there is a major problem of increasing costs in materials and the highly skilled labor needed to make such apparatus. For instance, glass valve bodies used in such apparatus frequently require side-opening passages. In the presently designed valves which use o-rings to form a seal between the inner surface of the glass valve body and the outer surface of the actuator or valve member, there are three principal factors affecting the skill and cost required in making such valves. They are: the glass tubing used in forming the valve body must be precision bore tubing; the sideopening passage must be precisely located; and the distortion of the inner glass wall must be kept to a minimum to stay within the tolerance limits of the o-ring seal, requiring a high degree of skill by the glass worker. Valves are usually made longer than necessary in order to minimize these problems, although without much success.

SUMMARY OF THE INVENTION

Accordingly, an object of this invention is to provide a seal which eliminates the need for an o-ring, thereby avoiding the problems associated with the use of an o-ring as discussed above, including the need for use of precision bore tubing, the need to precisely locate side-openings and the need to control distortion.

Another object of the invention is to provide a bellows seal for use in glass valves as used in the chemical industry, for example, thereby eliminating the need for o-ring seals.

A further object is to provide a unique method of making a bellows seal, in which the bellows is machined from a solid piece of stock material and subsequently shaped with a pleated configuration.

Yet another object of the invention is to provide a bellows seal for a valve actuator, in which the seal has a first end portion with a left-hand thread therein and a second end portion with a right-hand thread, for cooperation with an actuator stem having spaced apart, oppositely threaded portions thereon, so that the linear pitches of the two threaded portions are additive during operation of the valve to double the rate of movement of the valve upon turning of the actuator.

A still further object of the invention is to provide a bellows seal for a valve actuator, which, by a simple modification, enables the valve to be actuated by a screw-threaded shaft, a positive pressure piston or a vacuum responsive piston, depending upon the selection and arrangement of actuator components.

BRIEF DESCRIPTION OF THE DRAWINGS

The foregoing and other objects and advantages of the invention will become apparent from the following detailed description when considered with the accompanying drawings, in which like reference characters designate like parts throughout the several views, and wherein.

DETAILED DESCRIPTION OF THE PREFERRED EMBODIMENTS

Figure 1:
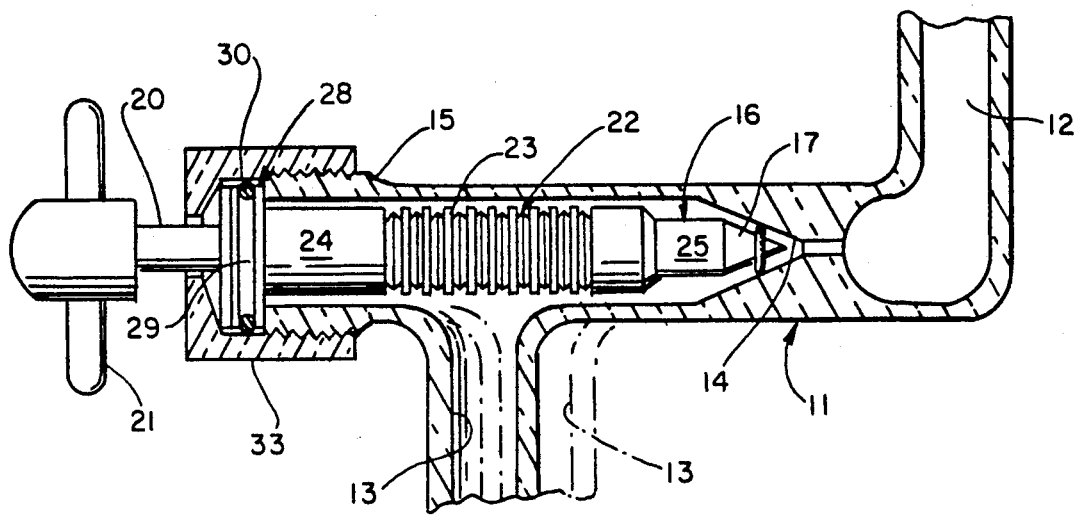
FIG. 1 is a longitudinal sectional view of a glass-bodied valve incorporating therein a first form of the bellows seal of the invention.
Figure 2:
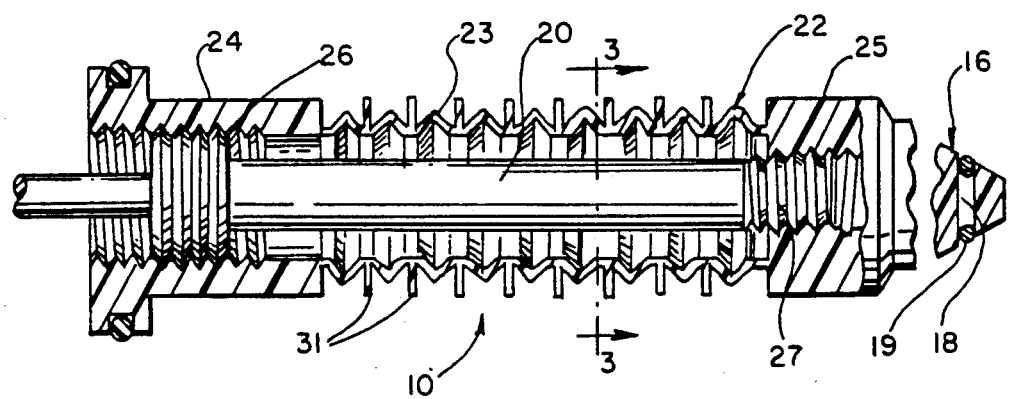
FIG. 2 is an enlarged, fragmentary, longitudinal sectional view of the bellows seal used in the invention shown in FIG. 1.
Figure 3:
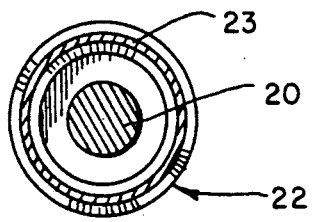
FIG. 3 is a transverse sectional view of the bellows seal and actuator of the invention, and is taken along line 3—3 in FIG. 2.

Referring more particularly to the drawings, a first form of the bellows seal according to the invention is indicated generally at 10 in FIGS. 1 through 3, and comprises a glass valve body 11 having an inlet port 12 and side-opening outlet port 13. A valve seat 14 is formed in the body between the inlet and outlet ports, and an extension 15 is formed on the body adjacent the outlet port for attachment of a valve actuator.

A valve member 16 is mounted in the body 11 for reciprocating movement toward and away from the seat 14, and in the specific example shown has a tapered nose 17 with an annular recess 18 and an o-ring seating member 19 fitted in the recess 17 for cooperation with the seat 14. Alternatively, the seating member could be formed integrally with the tapered nose.

The valve member 16 is caused to reciprocate by a threaded actuator shaft 20 extending through the glass body 11 and projecting beyond the extension 15, where a suitable hand grip 21 is provided on the end of the actuator shaft.

An actuator seal 22 extends coaxially around the actuator shaft, and comprises an elongate, tubular, bellows-like body 23 with a first internally threaded end portion 24 secured relative to the valve body 11, and a second internally threaded end portion 25, on which the valve member 16 is formed. The actuator shaft 20 has a pair of axially spaced apart, externally threaded portions 26 and 27 thereon threadably engaged with the internally threaded portions 24 and 25, respectively, whereby when the actuator shaft is turned, the interengaged screw threaded portions on the seal and shaft cause the valve member 16 to move toward and away from the valve seat, depending upon the direction of rotation of the shaft. The bellows 23 seals the actuator shaft from the fluid being controlled by the valve.

If desired, and as shown in the preferred embodiment of FIGS. 1-3, the interengaged screw threaded portions 24,26 and 25,27, respectively, may be oppositely threaded. Thus, the screw threads 24 and 26 may be left-hand threads while the screw threads 25 and 27 may be right-hand threads, for a right-hand opening valve, for example, although these directions could be reversed. With this arrangement, the linear pitches of the two interengaged threaded portions are additive during actuation of the valve, effectively doubling the rate of movement of the valve member 16 for a given rotational movement of the actuator.

A valve body sealing means 28 for sealing the bellows and actuator assembly to the valve body comprises a gripping saddle and o-ring assembly as described in my earlier patent number 4,669,763, for example. The seal 28 may comprise a separate gripping saddle with an o-ring held therein as shown in my earlier patent, or an annular channel 29 may be formed in the outer surface of the internally threaded end portion 24 and the o-ring 30 received in the channel, as shown in FIG. 2.

The bellows sea 23 is formed with a plurality of axially spaced apart annular reinforcing rings 31 thereon to increase the ability of the bellows to withstand internal pressures.

Figure 7:
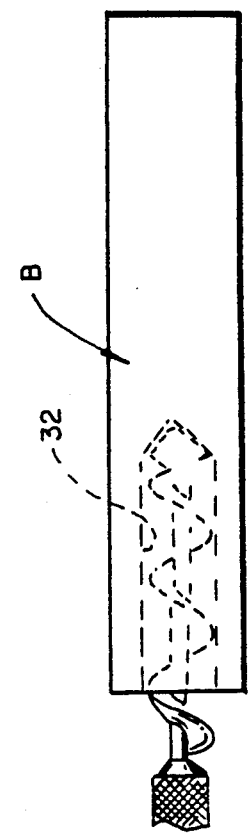
FIG. 7 is a schematic view illustrating a first step in manufacturing the bellows seal in accordance with the invention, i.e., drilling out the center of the solid piece of stock material.
Figure 6:
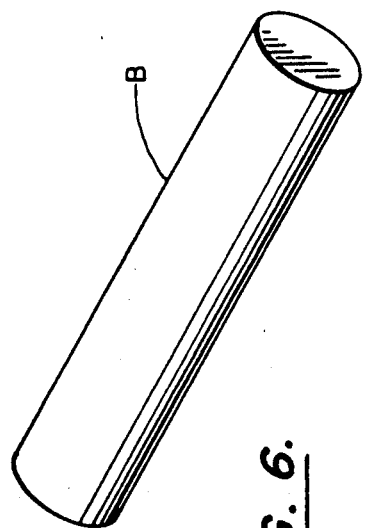
FIG. 6 is a perspective view of a piece of solid stock material used to make the bellows seal of the invention.
Figure 8:
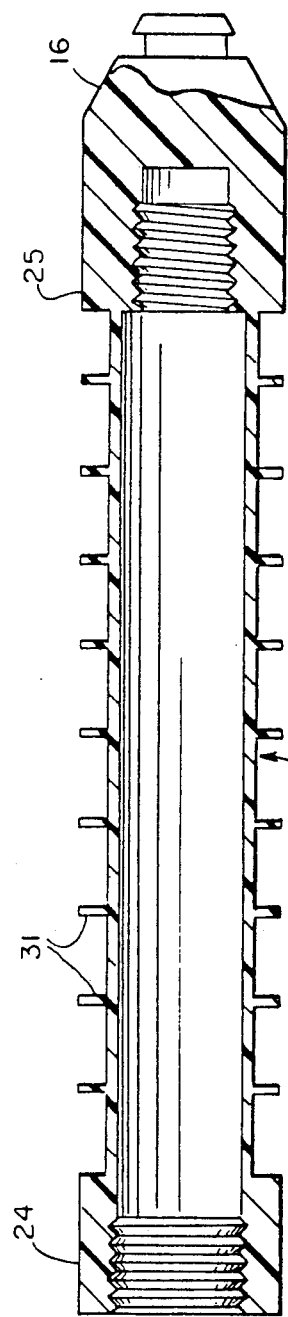
FIG. 8 is a side view of the bellows seal of the invention, showing parts in section and parts in elevation, after a second step in the manufacturing process, i.e. machining to form a tubular body with annular reinforcing rings thereon and body portions at opposite ends.
Figure 9:
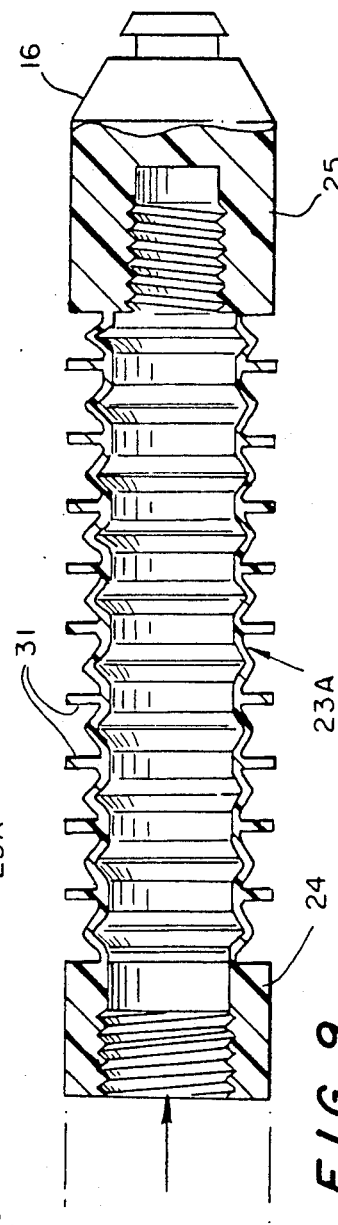
FIG. 9 is a partial longitudinal sectional side view of the bellows seal of FIG. 8 after a second manufacturing step, i.e. axial displacement of one end of the tubular body to form the bellows or accordion-like pleated configuration.

The bellows seal 23 is unique, and the method of making it is unique, as schematically illustrated in FIGS. 6-10. As shown in FIGS. 6 and 7, a solid piece of cylindrical bar stock "B" of suitable material is selected and an axial bore 32 formed therethrough by drilling or the like. The tubular piece resulting from this operation is then machined on a suitable apparatus such as a screw machine or the like (not shown) to form a cylindrical body 23A with opposite end portions 24 and 25, the valving member 16, and annular reinforcing rings 31, as shown in FIG. 8. The body 23A is then collapsed axially to form the bellows-like configuration as shown in FIG. 9.

Figure 10:
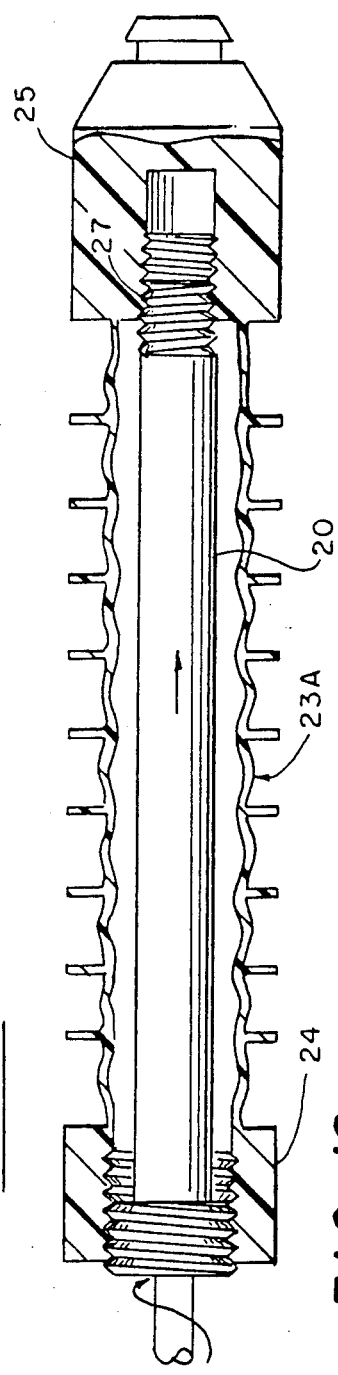
FIG. 10 is a schematic view in partial longitudinal section showing the manner in which the threaded actuator may be attached to the bellows seal.

To assemble the threaded actuator shaft 20 to the bellows seal 23, the bellows is stretched out and one end 27 of the shaft is inserted through the internally threaded end portion 24 of the seal and into engagement with the other threaded end 25 of the seal as shown in FIG. 10. It should be noted that the inside diameter of the end portion 24 is greater than that of end portion 25, and is also greater than the threaded end 27 of the shaft 20. ThuS, it is possible to threadably engage the end 27 with portion 25 prior to engagement of end 26 with internally threaded portion 24. The parts are then threaded together until the bellows returns to its normal state as shown in FIG. 9, or in dot-and-dash lines in FIG. 10, and the assembled actuator shaft and bellows seal are placed in the valve body and secured by end cap 33.

In use, with the actuator and bellows seal assembled to the valve body as shown in FIG. 1, rotation of the actuator in one direction causes the valving member 16 to move away from the valve seat and rotation of the actuator in the opposite direction causes the valving member to move toward the seat.

The bellows seal 23 is preferably made from a high molecular weight material having memory so that it will return to its at-rest configuration after being collapsed or stretched and having adequate strength so as not to crack or tear after it is flexed several thousand times during use. A high molecular Teflon has been found suitable, although other materials such as stainless steel, copper, brass, steel, or other alloys may be used, depending upon the environment in which the valve is to be used. For example, the material must have sufficient density that the fluid being controlled will not diffuse or penetrate through the thin wall of the bellows. An example of one suitable material is known as "Hi T Rod", catalogue number 800, by Chemglass.

In one particular embodiment incorporating the principles of the invention, the bellows seal has a minimum inside diameter of about 10 mm, a wall thickness about 0.25 mm, a maximum outer diameter of about 12-13 mm, and the reinforcing rings have a radial dimension of about 1.5 mm.

Further, although the bellows seal has been described as using the saddle and o-ring sealing assembly for sealing the bellows seal and actuator relative to the valve body, in a non-corrosive environment, an ordinary rubber faced type gasket can be used for this purpose.

Figure 4:
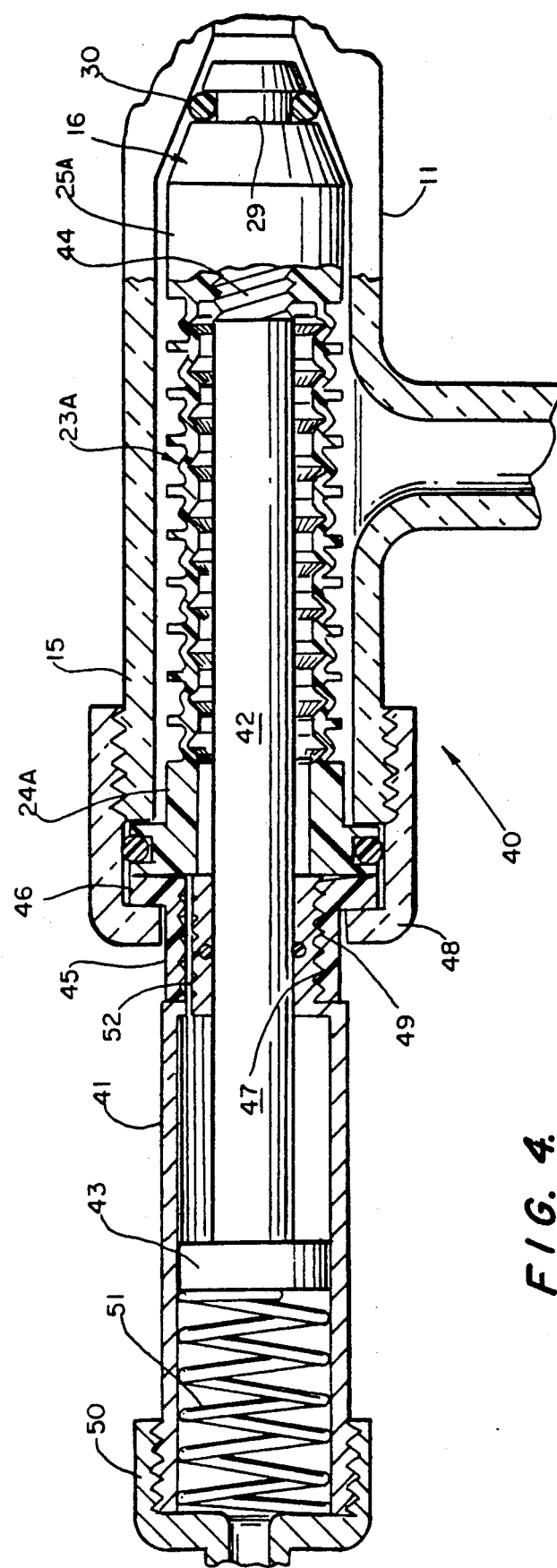
FIG. 4 is an enlarged, longitudinal sectional view of a first modification of the invention, in which a normally closed valve is modified to be actuated by application of a vacuum to the actuator.

A first modification of the invention is shown at 40 in FIG. 4. In this form of the invention, a cylinder 41 is attached to the extension 15 on the housing or valve body and the actuator shaft 20 is replaced with a much longer shaft 42 having a piston 43 on the outer end thereof and reciprocable in the cylinder. A slightly modified bellows seal 23A is used in this form of the invention, in that the fixed end 24A of the bellows seal is not internally threaded and the shaft 42 simply extends therethrough with radial clearance. Additionally, the inner end 44 of the shaft is in fixed threaded engagement with the end 25A of the bellows seal, whereby reciprocating movement of the shaft results in reciprocating movement of the end 25A and associated valving member 16. Alternatively, the bellows seal 23 could be identical to that described in relation to FIGS. 1-3, in which case the inner end 44 of the shaft 42 would be threadably engaged with the internally threaded end portion 25 of the bellows seal. In this case, the threads in the end portion 24 would not have any function, and the shaft 42 would simply extend, with radial clearance, through the end 24.

The cylinder 41 is attached to the valve body by means of an adaptor sleeve 45 having a radially outwardly directed flange 46 and internal threads 47. The flange has a slightly downwardly and outwardly tapered end surface for enhancing the clamping effect on the saddle and o-ring seal assembly, and is held to the valve body in clamped relationship against the saddle and o-ring assembly by threaded collar 48 engaged on the extension 15. The cylinder 41 has an externally threaded attaching nipple 49 of the end thereof, engaged in the threaded adaptor sleeve to hold the cylinder to the valve body, and the shaft 42 is sealed relative to the cylinder by means of an o-ring engaged between the shaft and the inside bore of the nipple 49.

A fitting 50 is engaged on the outer end of the cylinder for attachment to a source of vacuum, and a spring 51 is engaged between the fitting and the piston 43 to normally urge the piston, valve shaft and valving member to the right into closing engagement on the valve seat.

As shown at 52, a fat is formed axially through the threads on the nipple 49 to vent air from inside the bellows 23.

Figure 5:
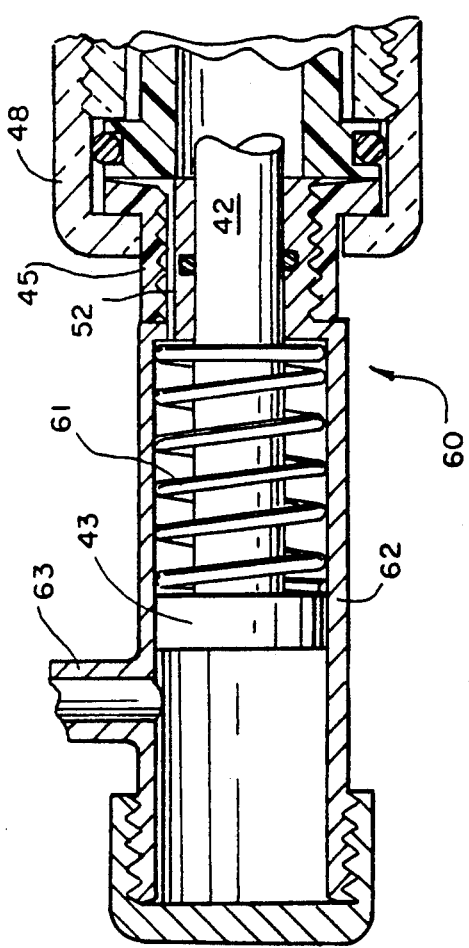
FIG. 5 is an enlarged, longitudinal sectional view of a second modification of the invention, in which a normally open valve is modified to be actuated by application of a positive pressure to the actuator.

A second modification of the invention is indicated generally at 60 in FIG. 5. In this form of the invention, a spring 61 is engaged between the piston 43 and the inner end of the cylinder 62 for urging the piston, shaft and valve member to the left to a normally open position. Of course, this relationship could be reversed as shown in FIG. 4, whereby the valve is normally closed. In addition, a fitting 63 is connected to the cylinder to admit air or other fluid under pressure to the outer end of the piston to urge it to the right to close the valve. It should be noted that if the spring is positioned to normally close the valve, then the air passage would be positioned to admit air to the other side of the piston to open the valve. In all other respects, this form of the invention is the same as that shown in FIG. 4.

The forms of the invention shown in FIGS. 4 and 5 both enable remote, programmed operation of the valve. These forms of the invention are very reliable in operation and may be desired, for example, when hazardous materials (explosive, radioactive, poisonous, etc.) are being controlled by the valve.

The bellows itself has uses other than as a valve actuator seal as described above. For example, the bellows could be used to join two out-of-line pipes, or to make a right angle connection, etc. It is not limited to a valve as particularly shown and described herein.

Although the invention has been described with reference to a particular embodiment, it is to be understood that this embodiment is merely illustrative of the application of the principles of the invention. Numerous modifications may be made therein and other arrangements may be devised without departing from the spirit and scope of the invention.

I claim:

1. The method of making a bellows seal for valves and the like, in which the seal comprises an elongate, accordion-pleated body having first and second ends and having a plurality of annular, axially spaced apart, radially outwardly projecting reinforcing rings thereon, comprising the steps of:
   providing a solid, one-piece bar or rod of material;
   forming, as by drilling or the like, an axial bore through one end of the piece of material, said bore extending over at least a substantial portion of the length of the piece of material;
   machining the piece of material to form a thin-wall tubular section having a plurality of annular, axially spaced apart reinforcing rings thereon; and
   axially compressing the machined piece of material to cause the thin-wall tubular section to deform between the reinforcing rings to produce an accordion-like pleated section.

2. In a fluid control valve having a valve body with an inlet, an outlet, a valve seat between the inlet and outlet, a valving member for movement toward and away from the valve seat into and out of closing and opening relationship therewith, and an actuator for moving the valving member toward and away from the valve seat, the improvement comprising:
   a one-piece bellows seal and valving member formed from a single piece of material, having first and second ends integral with the bellows, said bellows seal being coaxially disposed around the actuator, said first end being fixed and sealed relative to the valve body and said second end defining a valving member for movement toward and away from the valve seat, said actuator extending through the first end and being secured to the valving member, whereby operation of the actuator causes movement of the valving member toward and away from the valve seat, said bellows seal providing a seal against fluid leakage between the actuator and the valve body,
   said bellows seal comprising an elongate, accordion-pleated body,
   the first end of the bellows seal comprising a cylindrical body having a radially outwardly directed sealing flange which overlies an end of the valve body for fixing and sealing said first end relative to the valve body, and
   said second end comprising a cylindrical body on which said valve member is formed,
   said first and second ends of said bellows seal being integrally formed with the elongate, accordion-pleated body, and
   a plurality of axially spaced apart, radially outwardly directed reinforcing rings formed on the elongate, accordion-pleated body of the bellows seal.

3. In a valve as claimed in claim 2, wherein:
   said first and second ends of said bellows seal are internally threaded; and
   said actuator comprises an elongate shaft having an inner end and an outer end, a first threaded portion on the inner end of the shaft engaged with the internal threads in the second end of the bellows seal, and a second threaded portion adjacent the outer end engaged with the internal threads in the first end of the bellows seal, whereby when the actuator shaft is rotated the interengaged threads cause the second end of the bellows seal and thus the valving member to move relative to the valve seat.

4. In a valve as claimed in claim 3, wherein:

the pitch of the threads in the second end of the bellows seal and the mating threads on the actuator is reversed from the pitch of the threads in the first end of the bellows seal and the mating threads on the actuator, whereby the movement effected by the two oppositely pitched interengaged threaded portions is additive, resulting in a doubling of the movement of the valving member caused by a given rotational movement of the actuator.

5. In a valve as claimed in claim 2, wherein:
a cylinder is fixed on the valve body;
said second end of said bellows seal is internally threaded;
said actuator comprises an elongate shaft having an inner end and an outer end, the inner end of the shaft having a threaded portion fixedly engaged with the internal threads in the second end of the bellows seal, and the outer end thereof having a piston formed thereon, said piston being reciprocable in the cylinder;
resiliently yieldable means engaged between the piston and cylinder for urging the piston, and thus the shaft and valving member in a first direction relative to the valve seat; and
means for admitting fluid pressure into the cylinder to act on the piston to move the piston, and thus the shaft and valving member in a second direction relative to the valve seat.

6. In a valve as claimed in claim 5, wherein:
the fluid pressure is a negative pressure or vacuum.

7. In a valve as claimed in claim 5, wherein:
the fluid pressure is a positive or superatmospheric pressure.

* * * * *